US011933333B2

(12) United States Patent
Naber

(10) Patent No.: US 11,933,333 B2
(45) Date of Patent: Mar. 19, 2024

(54) DOWNDRAFT ELEMENT AND ASSEMBLY

(71) Applicant: Naber Holding Gmbh & Co., Nordhorn (DE)

(72) Inventor: Hans-Joachim Naber, Nordhorn (DE)

(73) Assignee: Naber Holding Gmbh & Co. (DE)

( * ) Notice: Subject to any disclaimer, the term of this patent is extended or adjusted under 35 U.S.C. 154(b) by 0 days.

(21) Appl. No.: 17/746,262

(22) Filed: May 17, 2022

(65) Prior Publication Data

US 2022/0373005 A1 Nov. 24, 2022

(30) Foreign Application Priority Data

May 21, 2021 (DE) ...................... 10 2021 113 244.4

(51) Int. Cl.
*F16L 55/04* (2006.01)
*F15D 1/04* (2006.01)
*F16L 43/00* (2006.01)

(52) U.S. Cl.
CPC .............. *F15D 1/04* (2013.01); *F16L 43/003* (2013.01)

(58) Field of Classification Search
CPC ................................. F15D 1/04; F16L 43/003
USPC ....................................................... 138/30, 39
See application file for complete search history.

(56) References Cited

U.S. PATENT DOCUMENTS

| | | | | |
|---|---|---|---|---|
| 4,032,265 A | * | 6/1977 | Miller .................. | F04B 11/0016 137/565.34 |
| 5,937,908 A | * | 8/1999 | Inoshiri ..................... | F15D 1/02 138/37 |
| 6,076,557 A | * | 6/2000 | Carney .................... | F15B 1/103 138/30 |
| 7,665,484 B2 | * | 2/2010 | Kamada ............. | F02M 37/0041 138/30 |
| 2002/0084138 A1 | | 7/2002 | Weinstein | |
| 2011/0168482 A1 | * | 7/2011 | Merchant ................ | F01D 25/30 181/224 |
| 2019/0316805 A1 | * | 10/2019 | Bruckbauer ............ | F24F 13/02 |

FOREIGN PATENT DOCUMENTS

| | | |
|---|---|---|
| CN | 210566911 U | 5/2020 |
| CN | 211624538 U | 10/2020 |
| DE | 9001554 U1 | 6/1990 |
| DE | 202004013575 U1 | 3/2005 |
| DE | 10360839 B3 | 6/2005 |
| EP | 1788259 A1 | 5/2007 |
| EP | 2444710 A1 | 4/2012 |
| KR | 20110019917 A | 3/2011 |
| RU | 2606463 C2 | 1/2017 |
| WO | 2018-206046 A1 | 11/2018 |

* cited by examiner

*Primary Examiner* — James F Hook
(74) *Attorney, Agent, or Firm* — Harness, Dickey & Pierce, P.L.C.

(57) ABSTRACT

A downdraft element having a first flow opening and a second flow opening, wherein the first flow opening is arranged relative to the second flow opening at an angle 45°≤α≤135°, preferably substantially of 90°, so that at least the average flow direction of a fluid entering the first flow opening and exiting the second flow opening or vice versa is deflectable, characterized in that the downdraft element comprises at least one damper material receptacle on an inner side between the first flow opening and the second flow opening and at least one damper inserted into the damper material receptacle. The invention further relates to a corresponding assembly.

16 Claims, 9 Drawing Sheets

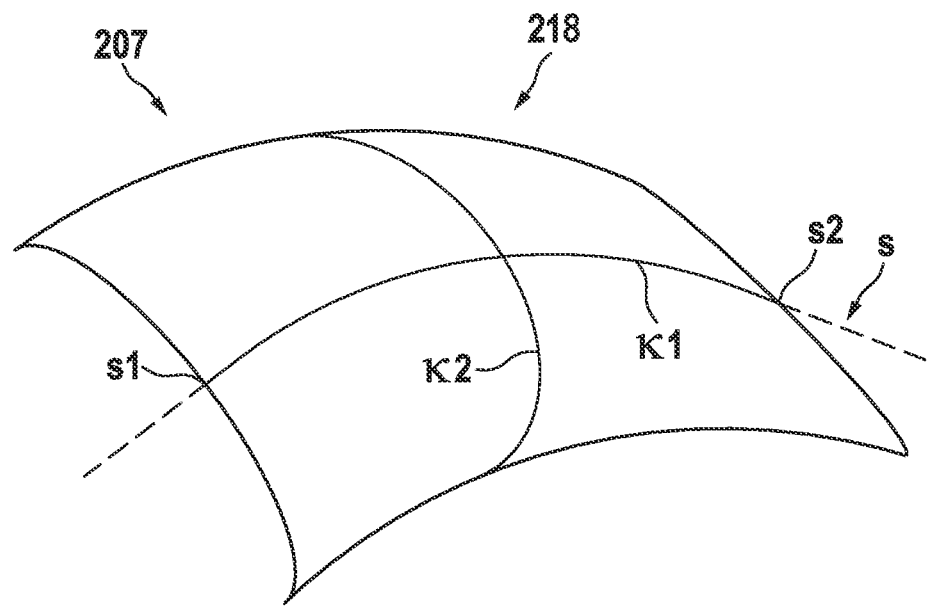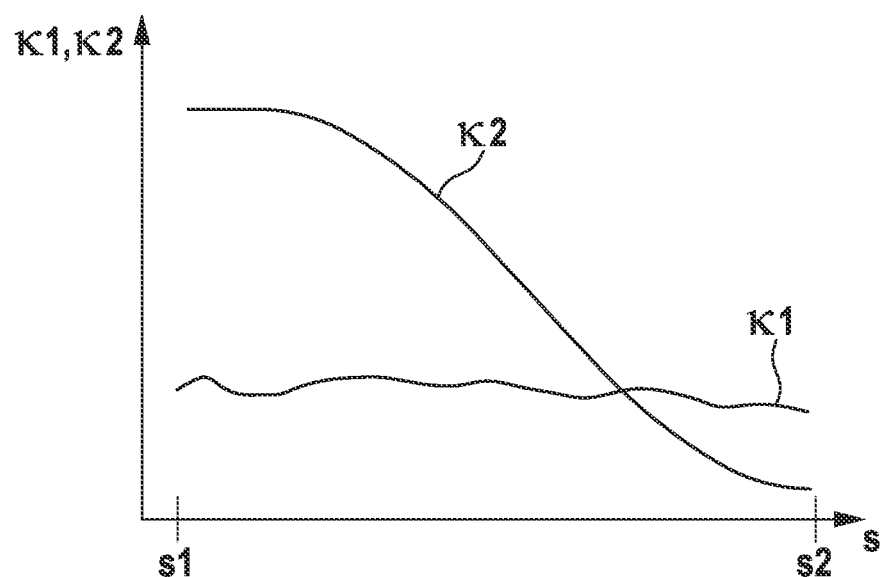
Fig. 4

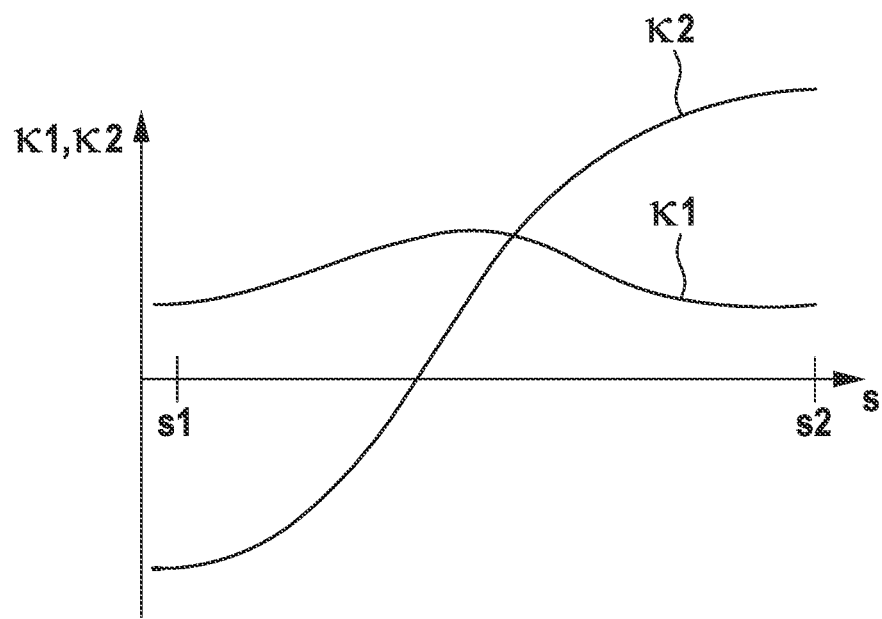
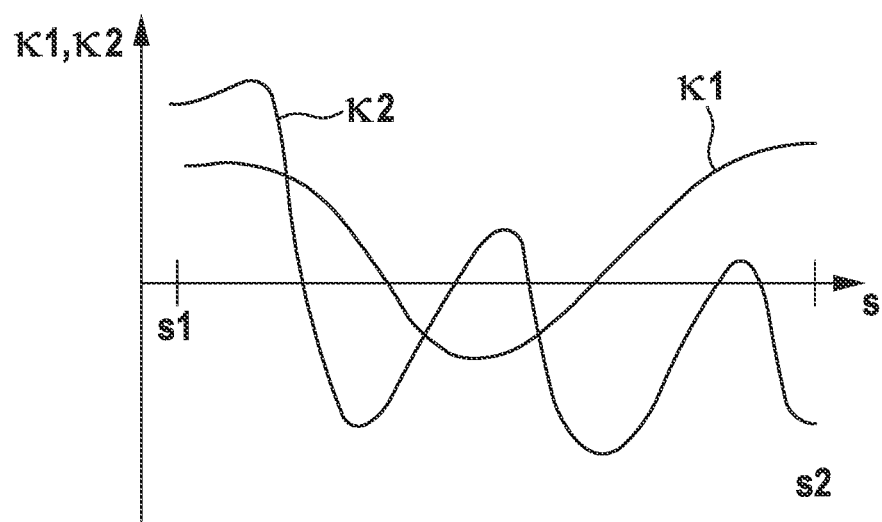
Fig. 5

DOWNDRAFT ELEMENT AND ASSEMBLY

CROSS-REFERENCE TO RELATED APPLICATIONS

This application claims the benefit and priority of German Patent Application No. 10 2021 113 244.4 filed May 21, 2021, the disclosure of which is hereby incorporated by reference herein in its entirety.

FIELD

The invention relates to a downdraft element having a first flow opening and a second flow opening, wherein the first flow opening is arranged relative to the second flow opening at an angle $45° \leq \alpha \leq 135°$, preferably substantially of 90°, so that at least the mean flow direction of a fluid entering the first flow opening and exiting the second flow opening or vice versa can be deflected by the angle $\alpha$.

BACKGROUND

A downdraft element is known, for example, from WO 2018/206046 A1. Such downdraft elements are known, for example, from kitchen construction and are used to remove vapors produced during cooking from the kitchen. When flow passes through the downdraft element, noise is generated by the flow, which is also amplified by the deflection of the flow. This background noise is often disturbing. In particular, if the downdraft element is made of or has sheet metal, significant noise pollution can occur during operation due to the vibrations induced by the flow through it.

SUMMARY

It is therefore an aspect of the present invention to provide a downdraft element and a corresponding assembly which is quieter in operation.

According to a preferred embodiment of the invention, the downdraft element has at least one damper material receptacle and at least one damper inserted into the damper material receptacle on an inner side between the first flow opening and the second flow opening. The damper or a surface of the damper may be curved. The damper inserted into the damper receptacle may be shaped or curved to correspond to or form a portion of a fluid crossed inner surface or inner wall of the downdraft member.

The downdraft element may be arranged to deflect a flow substantially in a vertical direction. However, it may also be provided that the downdraft element can redirect a flow substantially in a horizontal direction. The downdraft element may be a pipe bend. Although the term "downdraft element" suggests a "downward" deflection, the present invention is not necessarily limited to such a deflection direction. The features of the invention, downdraft elements according to the invention as well as assemblies according to the invention can have any direction of flow deflection. By mean flow direction, a course of streamlines of the fluid flowing through the downdraft element averaged over time may be meant.

The downdraft element may comprise or have a sheet metal. Alternatively, or additionally, the downdraft element may consist of or comprise a plastic.

The damper material receiving means may be disposed substantially symmetrically with respect to the first flow opening and the second flow opening on a distal inner side of the downdraft element. The distal inner side may face a proximal inner side, wherein the distal inner side may have a larger circumference and/or a larger radius than the proximal inner side along the central flow direction through the downdraft element. The term radian dimension does not necessarily imply here that the proximal inner side and/or the distal inner side describes a circular arc or must have such a shape.

The damper material receptacle can have at least one retaining element that can fix the damper received in the damper material receptacle in a force-fitting and/or form-fitting manner.

The damper can be shaped in such a way and/or have a material at least on a surface over which the fluid can flow, so that the inner side over which the fluid can flow can merge essentially evenly into the surface of the damper. Thus, a substantially smooth transition can be produced between the inner side over which the fluid can flow and the surface of the damper. By the wording "even transition", a fluidically smooth transition may be meant. The surface of the damper and/or the inner side may be fluidically smooth.

The inner side can have a flow guide element arranged in front of and/or behind the damper material receptacle in the direction of flow, so that the inner side can merge essentially evenly into the surface of the damper via the flow guide element. It may be provided that the damper abuts the flow guide element such that no detachment edge or the like is formed. The flow guide element may be fluidically smooth.

The downdraft element may include at least one guide body spaced from the inner surface and disposed between the first flow opening and the second flow opening for guiding the flow. The guide body may be or comprise a guide fin. Alternatively, or additionally, the guide body may have a wing profile and/or be shaped like a wing.

The guide body may be arranged with a guide surface spaced substantially parallel from the damper material receptacle and/or facing the damper material receptacle at least in sections. Alternatively, or additionally, the guide body may be arranged with a guide surface spaced substantially parallel from the damper and/or facing the damper at least in sections. The guide body may have a corresponding curvature or be curved.

At least one of the guide bodies can be at least partially punched or perforated or have at least one aperture. The perforation, perforation or aperture may be arranged in such a way that it is preferably spaced substantially parallel to the damper in the central direction of flow.

The baffle may be doubly curved, wherein a first curvature may be arranged substantially along the mean flow direction and a second curvature may be arranged substantially perpendicular to the first curvature. The first curvature and/or the second curvature may have at least one change of sign. It may be provided that the first and/or second curvature may be suitably varied locally such that a mean pressure drop of the downdraft element is reduced.

At least one inner side, preferably a distal and/or a proximal inner side, can be formed like a partial-circular arc along the central flow direction at least in one section, whereby the local radius of curvature of the section can preferably be formed variably. Thus, the proximal and/or distal inner side over which the fluid flows can deviate at least locally from a perfect pitch circle or cylinder wall, for example a quadrant or a corresponding cylinder wall at an angle $\alpha$ of 90°. However, it may also be provided that proximal and/or distal inner side forms at least approximately a perfect pitch circle or corresponding cylinder wall.

It may be provided to suitably vary the local radius of curvature so that a mean pressure drop of the downdraft element is reduced.

The downdraft element can be of two-shell design with two shell halves, whereby the respective shell parts can preferably be mirror-symmetrical, whereby the shell parts can be clamped, bonded, welded and/or screwed together. This allows, for example, guide bodies or dampers to be inserted or exchanged easily and conveniently in the downdraft element.

The downdraft element can have a mounting receptacle at or near the first flow opening and/or second flow opening, into which a pipe system element can be insertable for establishing a fluidic connection of the pipe system element to the downdraft element. The pipe system element may be or comprise, for example, another downdraft element, a pipe, a flat duct, a baffle, or the like. Preferably, a stop may be circumferentially arranged in the mounting receptacle, which may define a defined insertion depth of the pipe system element. The pipe system element can be a part of a pipe system.

The downdraft element may have a mounting web, by means of which the downdraft element may be insertable into a pipe system element for establishing a fluidic connection of the downdraft element to the pipe system element. For example, the pipe system element may be or include another downdraft element, a pipe, a flat duct, a baffle, or the like. Preferably, the mounting web may comprise a preferably circumferentially arranged stop that may define a defined insertion depth of the downdraft element. The pipe system element may be a part of a pipe system. The stop of the mounting web may be arranged on an outer side of the mounting web.

The downdraft element can have at least one latching lug arranged at and/or near the first flow opening and/or the second flow opening, via which the downdraft element can be releasably connected to the pipe system element. The pipe system element may be or comprise, for example, another downdraft element, a pipe, a flat duct, a baffle, or the like. The pipe system element may be a part of a pipe system.

The downdraft element can preferably have a marking on an outer side which can indicate a flow direction through the flow openings with the lowest average pressure loss. It may be envisaged that the downdraft element has a preferred flow direction due to its shape, the damper material receptacle with damper received therein and/or the curvatures of the conductive element and/or the inner sides. By means of the marking, the preferred flow direction can be easily and conveniently taken into account during assembly, so that a lower pressure loss of the downdraft element and consequently of the overall system can result.

The invention further relates to an assembly comprising a downdraft element and at least one pipe system element having an opening, wherein
a. the downdraft element has at least one latching lug at and/or near the first flow opening and/or the second flow opening, and the pipe system element has at least one latching receptacle complementary to the latching lug, via which the first flow opening and/or the second flow opening of the downdraft element and the opening of the pipe system element are detachably fluidically connected to one another, and/or
b. the downdraft element has a mounting receptacle at or near the first flow opening and/or second flow opening, and the pipe system element has a preferably circumferential fastening projection at the opening, the fastening projection being received in the mounting receptacle and the first flow opening and/or the second flow opening of the downdraft element being fluidically connected to the opening of the pipe system element, and/or
c. the downdraft element has a mounting web at or near the first flow opening and/or second flow opening, and the pipe system element has an insertion receptacle at the opening, the mounting web being received in the insertion receptacle and the first flow opening and/or the second flow opening of the downdraft element being fluidically connected to the opening of the pipe system element.

Due to the firm and secure connection of the downdraft element to the pipe system element established in this way, vibrations of the downdraft element can in principle be transmitted to the pipe system element, especially if they are made of or have a sheet metal, so that noise can be generated when flow passes through them. In addition, the connection between the two elements can become loose over time unless further precautions are taken. Thus, the downdraft element damper may reduce downdraft element vibration induced by flow therethrough, thereby both reducing the noise of the piping system and increasing the life of the connection. For example, the pipe system element may be or include another downdraft element, a pipe connector, a baffle, or the like.

The downdraft system may include at least one flow directing member and the piping system member may include at least one piping system flow directing member, wherein
a. the pipe system flow guide body can protrude into the downdraft element and/or
b. the pipe system flow guide body can merge into the guide body and/or be arranged parallel in front of and/or behind the guide body in the direction of flow.

This allows a good flow through the downdraft element to be achieved. The pressure drop of the downdraft element can be reduced.

DRAWINGS

The invention is explained in more detail with reference to the following figures. Thereby show:

FIG. 4 is an exemplary double-curved surface with an exemplary course of the first and the second curvature;

Figure 6:
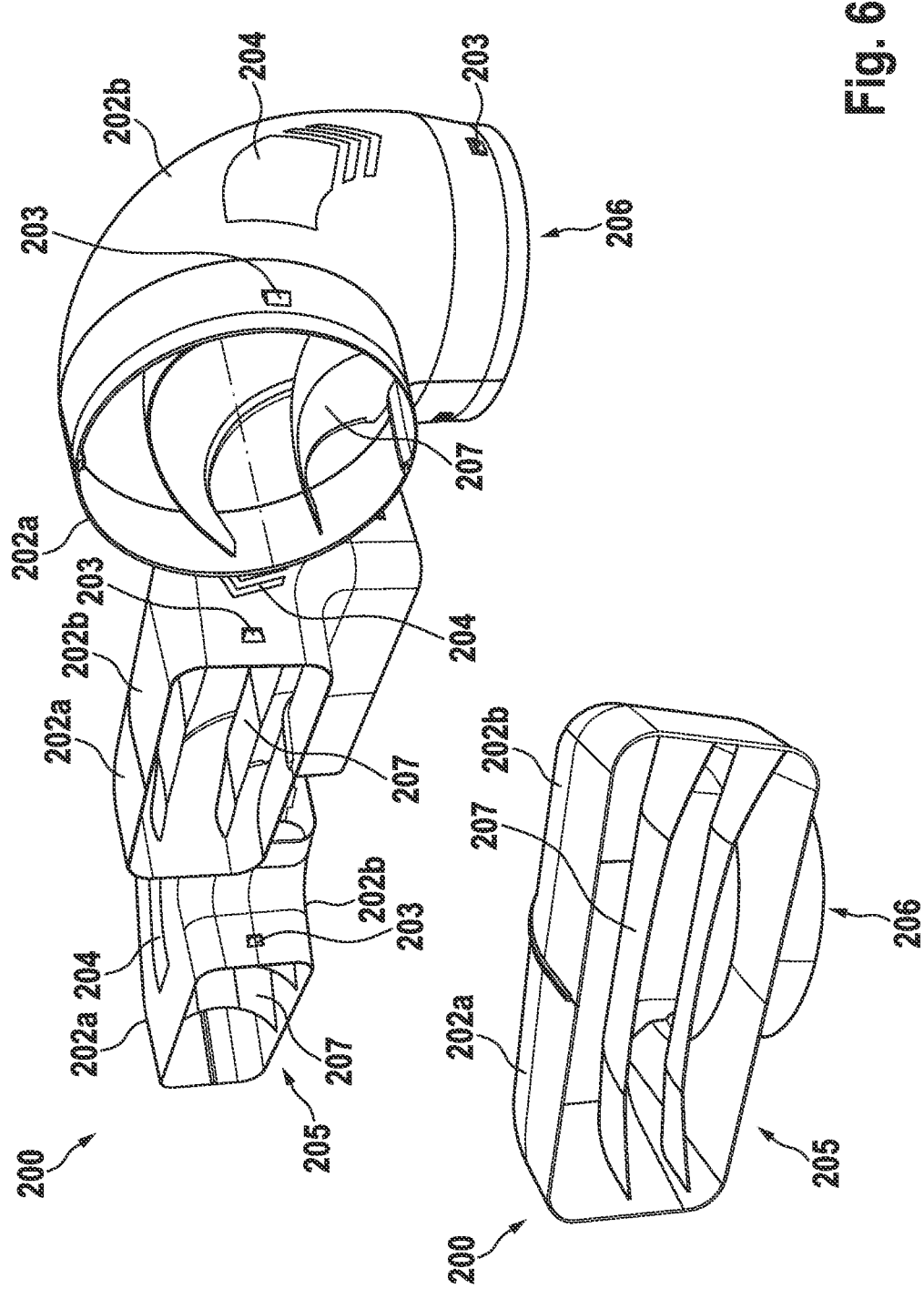
Figure 7:
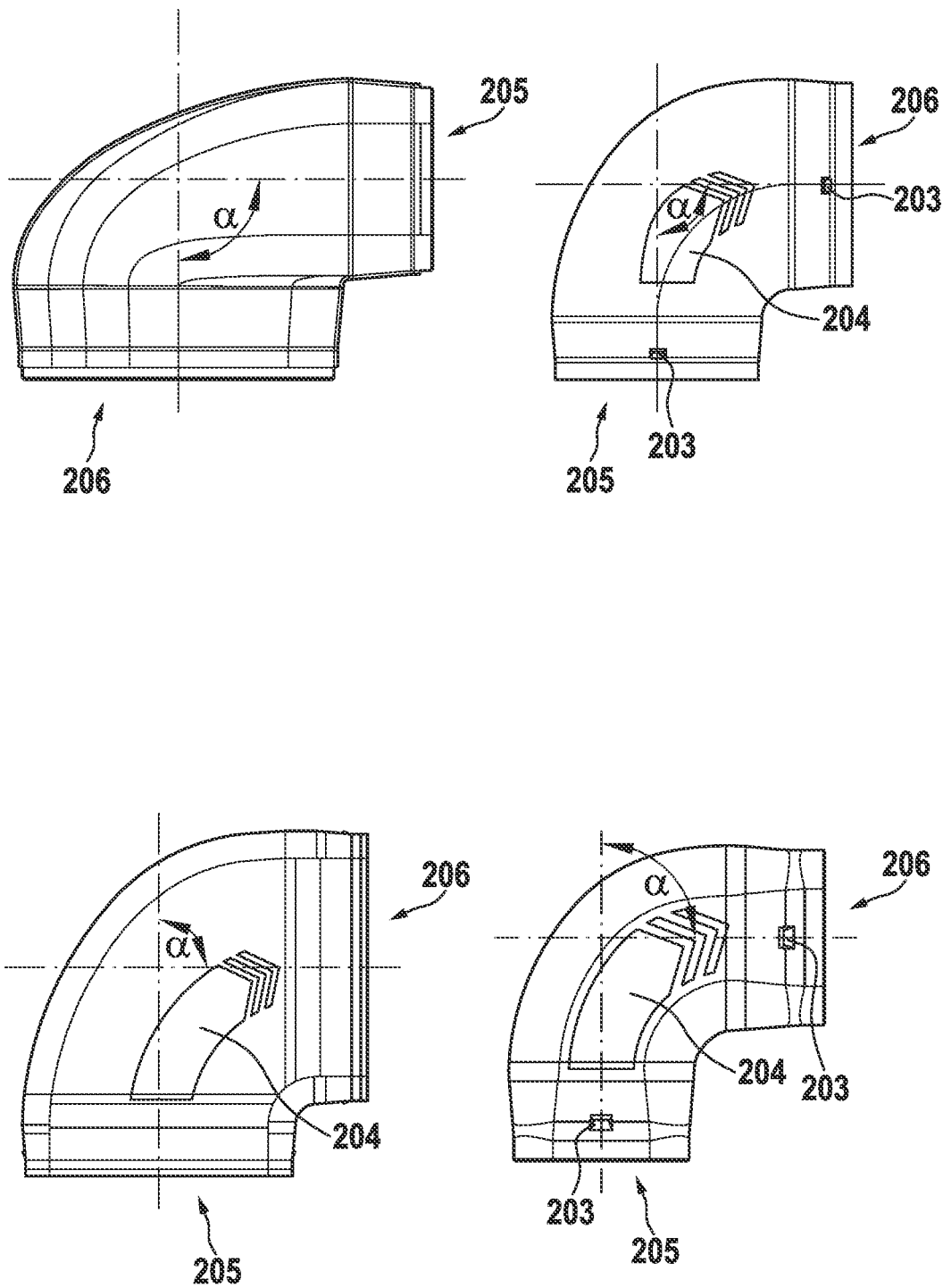
Figure 8:
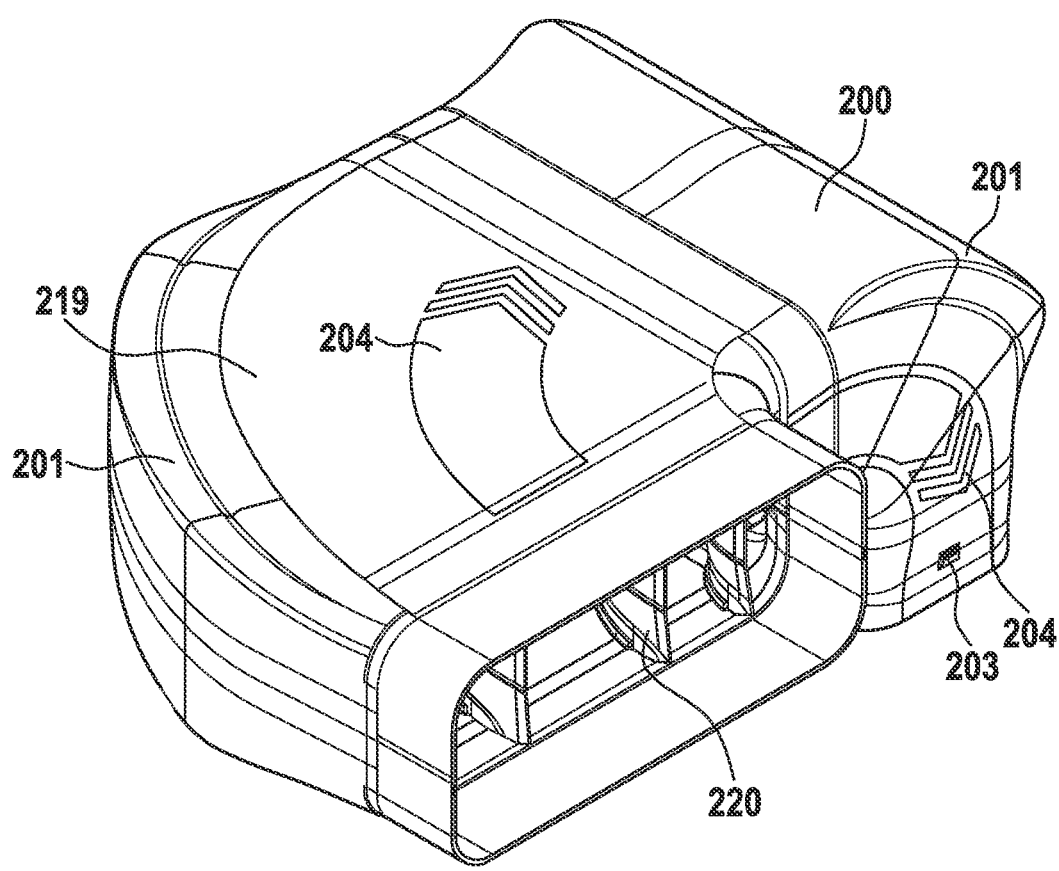
Figure 9:
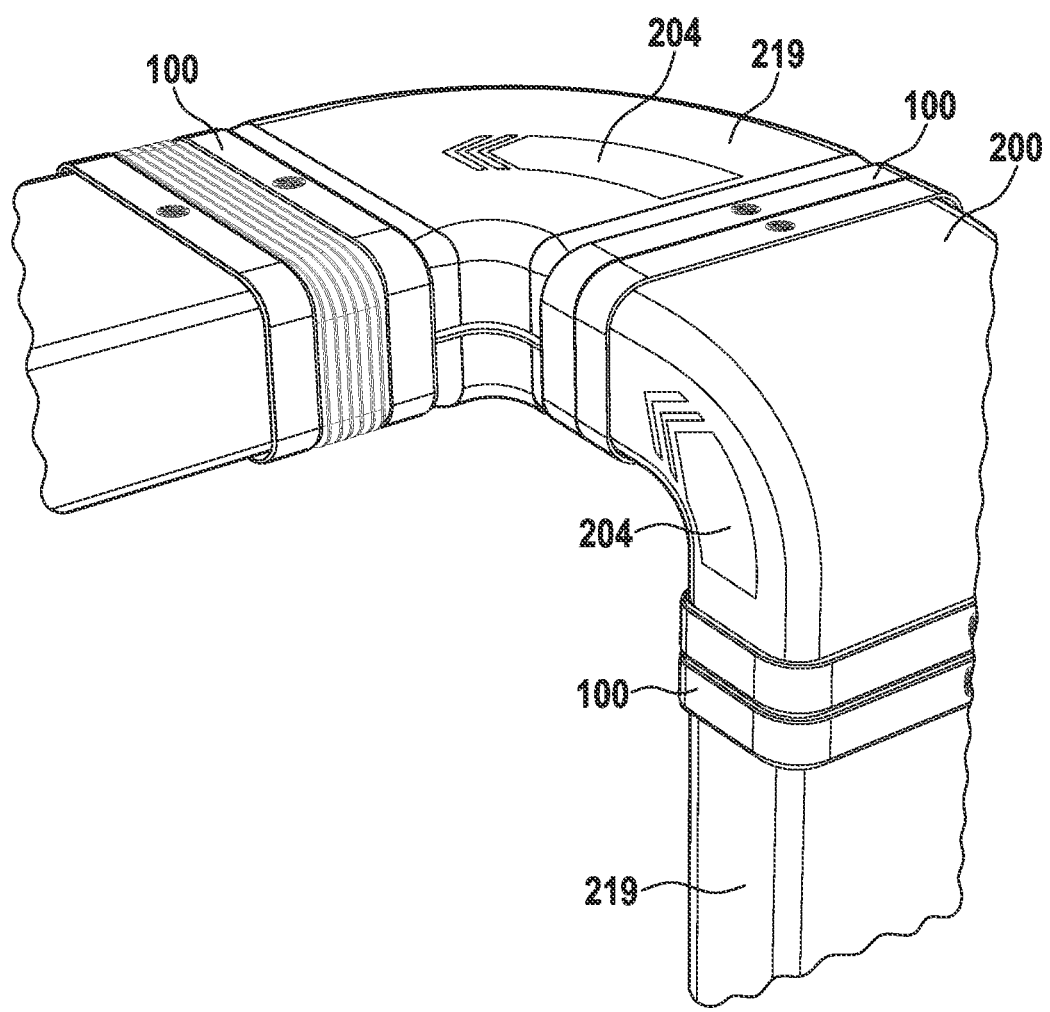

FIG. 5 further exemplary curvatures of the first and second curvature;

FIG. 6 are perspective views of further exemplary embodiments of downdraft elements according to the invention;

FIG. 7 shows further exemplary embodiments of downdraft elements according to the invention;

FIG. 8 an exemplary assembly of a downdraft element and a pipe system element according to the invention; and FIG. 9 another exemplary assembly of a downdraft element and pipe system elements according to the invention.

DETAILED DESCRIPTION

Figure 1:
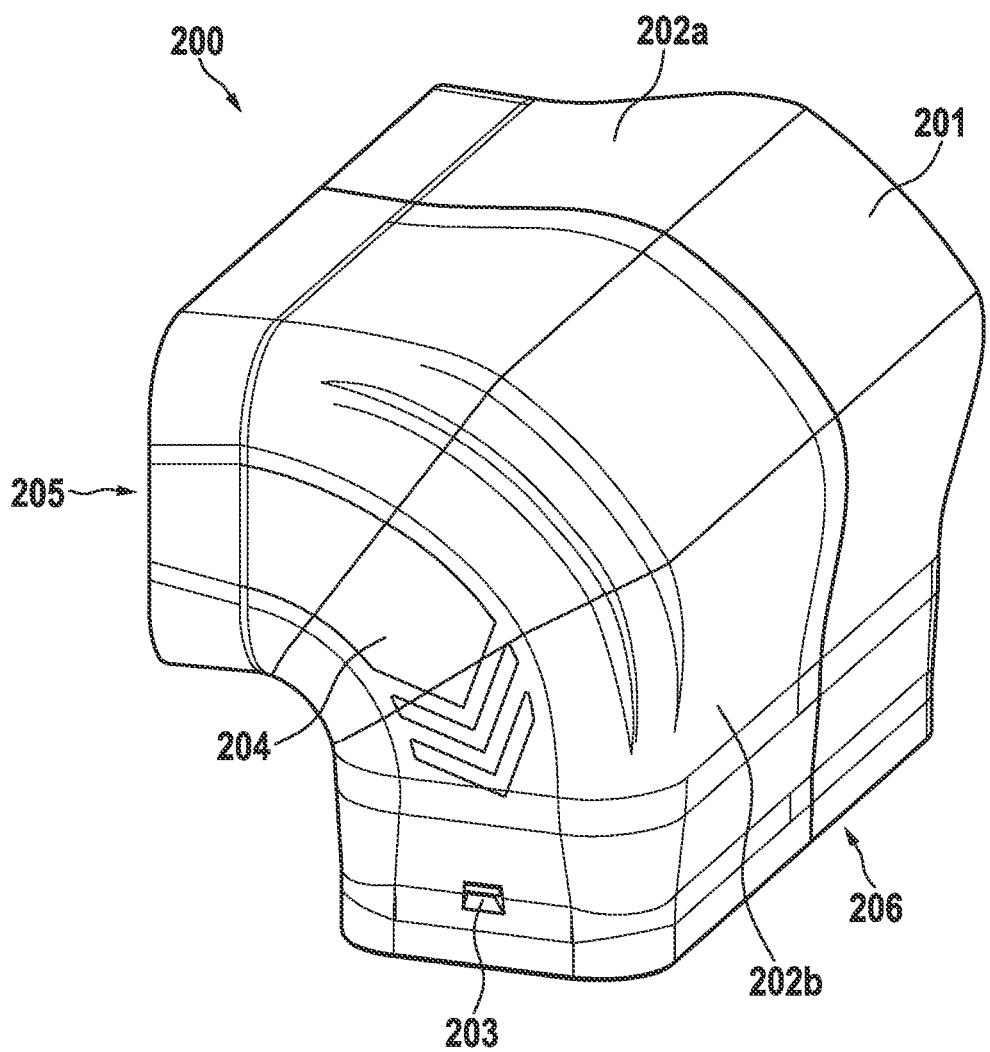
FIG. 1 is a perspective view of an embodiment of a downdraft element according to the invention.

FIG. 1 shows a first embodiment of a downdraft element 200 according to the invention. The downdraft element 200 comprises a damper material receptacle 201 into which a damper 214 is inserted. The downdraft element 200 has a first flow opening 205 and a second flow opening 206. A fluid, such as gases or vapors, can flow through the downdraft element through the flow openings 205, 206. The flow openings 205, 206 are arranged at an angle α to each other, where the angle can be 45° a 135° (see also FIG. 7). In the embodiment example shown in FIG. 1, the angle α is essentially 90°. Thus, the downdraft element 200 deflects the fluid flowing through the downdraft element 200 by a corresponding angle α at least in its central flow direction. In particular, the fluid may be or become deflected from a substantially horizontal flow direction to a substantially vertical flow direction. However, the direction of the deflection, or the orientation of the downdraft element 200 and the angle α are not limited to the embodiments shown in FIGS. 1 to 9. It may also be provided to use the downdraft element to deflect a fluid through an angle, for example, in a plane. Thus, the downdraft element 200 may not be limited exclusively to a deflection from a substantially horizontal direction to a substantially vertical direction.

The downdraft element 200 may be of a two-component construction. For example, the downdraft element 200 may comprise or include two preferably mirror symmetrical shell portions or half portions 202a, 202b. The two half-parts 202a, 202b may be clamped together, interlocked, glued, welded, or otherwise suitably joined together. The connection of the two half parts 202a, 202b may be fluidically tight.

The downdraft element 200 can have a latching lug 203. Via the latching lug 203, the downdraft element 200 can be detachably connected to, for example, a further downdraft element 200 or another pipe system element, for example a pipe connector, a pipe, a flat duct, a pipe bend or the like. The further downdraft element or the pipe system element may have a detent receptacle complementary to the detent lug 203.

It may be provided that the downdraft element 200 has a preferred flow direction. The preferred flow direction may be determined by the pressure drop during flow in the preferred flow direction being minimized and/or minimal. For example, in the embodiment shown in FIG. 1, the pressure drop when flowing into the first flow opening 205 and flowing out of the second flow opening 206 may be less than the pressure drop when flowing into the second flow opening 206 and flowing out of the first flow opening 205. Preferably, the downdraft element 200 may include a marking 204 on an exterior surface that may indicate the preferred direction of flow. In particular, this can prevent incorrect assembly in which flow through the downdraft element 200 during operation is unfavorable to the intended direction of flow.

Figure 2:
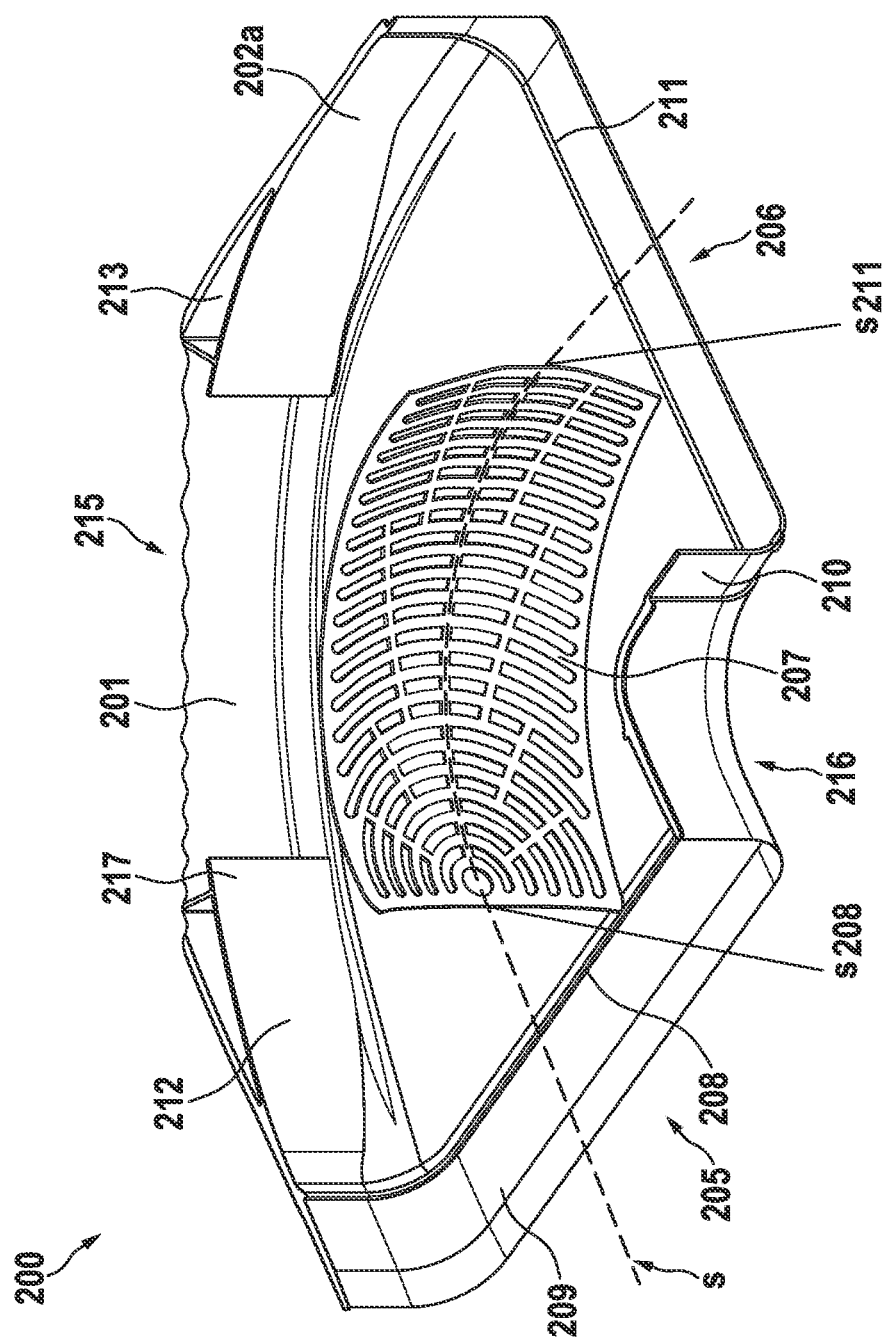
FIG. 2 is a sectional view of an embodiment of a downdraft element according to the invention.

A further embodiment of a downdraft element 200 according to the invention is shown in FIG. 2 in a perspective sectional view. The depicted part of the downdraft element 200 may correspond to a shell part or half part 202a (or 202b), which together with a second half part 202b (or 202a), which is not depicted, may form the downdraft element 200. The two half parts 202a, 202b may be mirror symmetrical. A cushioning material receptacle 201 may be disposed on an inner wall or inner side of the downdraft element 200. It may be provided that the damper material receptacle 201 is arranged at a distal inner side 215. As shown in FIG. 2, the distal inner side 215 may be opposite a proximal inner surface 216, wherein the distal inner side 215 has a larger circumference and/or radian dimension than the proximal inner surface 216 along the central direction of flow through the downdraft element 200. The term radian dimension does not necessarily imply here that the proximal inner side 216 and/or the distal inner side 215 describes an arc of a circle or must have such a shape. The local curvature of the distal inner side 215 and/or the proximal inner side 216 may vary along the respective inner sides. It may also be provided that at least one of the further inner walls (or inner sides) forming the interior of the downdraft element 200 with the inner sides 215, 216 have a locally varying curvature.

A damper 214 not shown in FIG. 2 is received in the damper material receptacle 201. The damper 214 may, for example, dampen pressure fluctuations of a fluid flowing through the downdraft element 200 so that flow noise generated by the fluid is reduced. The damper 214 may be or serve as a muffler. The dampening material receptacle 201 may be arranged substantially symmetrically with respect to the first flow opening 205 and the second flow opening 206. In particular, the damper material receptacle 201 may be disposed along the inner side centrally between the first flow opening 205 and the second flow opening 206 as shown in FIG. 2. Preferably, the damper material receptacle 201 may be disposed at or near the distal inner side 215.

The damper material receptacle 201 may include at least one retaining element 217. The retaining element 217 may be or may be used to fix the damper 214 received in the damper material receptacle 201. The retaining element 217 may have a web that forms, for example, a groove-shaped receptacle for one end of the damper 214.

The damper 214 may be shaped and/or have a material on at least one surface over which the fluid may flow, such that a substantially smooth transition may be produced between the inner wall or inner side 215 over which the fluid may flow and the surface of the damper 214. The damper 214 inserted into the damper material receptacle 201 can thus form part of the inner wall or inner surface of the downdraft element 200. The surface of the damper 214 over which the fluid flows may be fluidically smooth.

At least one flow guide element 212 may be disposed upstream and/or downstream of the downdraft material receiving member 201. In particular, the flow guide element 212 can guide a fluid flowing through the downdraft element 200 to the damper 214. In this way, the transition of the inner side 215 or its part over which the fluid can flow to the damper 214 can take place in a flow-favorable manner and/or have at most a negligibly small additional flow resistance. It may be provided that the damper 214 inserted into the damper material receptacle 201 is shaped in such a way that it preferably terminates evenly with the retaining element 217 and/or the web thereof, or the retaining element or the web 217 is not stepped by the damper 214, in order to thereby avoid possible detachment edges. Any gap between the damper 214 and the flow guide element 212 should be so small that at most a negligibly small additional flow resistance can occur.

The downdraft element 200 may include at least one guide body 207. The guide body 207 may be disposed between the first flow opening 205 and the second flow opening 206, and may guide the fluid flowing through the downdraft element 200 and/or assist in redirecting the fluid flow. This may reduce the pressure drop of the flow through the guide body 207. The guide body 207 may be a guide fin or have a fin-like shape. However, the guide body 207 may also have a vane shape. The conductive body 207 may be double curved. It may be provided that at least one of the curvatures of the conductive body 207 is not constant. At least one of the curvatures of the conductive body 207 may have a sign change. The conductive body 207 may be spaced parallel to the damper material receptacle 201 in the downdraft element 200. The conductive body 207 may be arranged centrally with respect to the flow openings 205, 206. However, it may also be provided that the guide body 207 is arranged closer to the distal inner side 215 or the proximal inner side 216 as shown in FIG. 2. It may be provided that at least two conductive bodies are arranged in parallel and at least partially spaced substantially perpendicular to each other in the downdraft element 200. The conductive body 207 may be at least partially punched and/or perforated or have at least one aperture. The perforations and/or apertures may have a pattern, such as the circular pattern shown in FIG. 2. However, it may also be provided that the perforations or apertures are not evenly or regularly distributed over the conductive body 207. This allows pressure equalization of the partial fluid streams split by the conductive body 207 to occur over or through or across the conductive body 207. Pressure fluctuations of the partial fluid stream facing away from the damper 214 can thus be transported to the damper 214 and damped by the damper 214. Alternatively or additionally, two or more guide bodies 207, possibly also non-perforated or not provided with apertures, can be arranged one behind the other in the downdraft element 200 in the direction of flow, wherein a gap can be formed between the guide bodies or the guide bodies can be offset laterally with respect to one another. In this case, pressure fluctuations can also be effectively damped by the damper 214.

The downdraft element 200 may include a mounting receptacle 209. A stop 208 may be disposed on an inner side of the mounting receptacle 209. Another downdraft element and/or a pipe system element, such as a pipe connector or a baffle, may be or may be inserted into the mounting receptacle 209. The stop 208 may define an insertion depth of the mounting receptacle 209. For example, a corresponding further downdraft element or pipe system element may be inserted into the mounting receptacle 209 up to the stop 208. The downdraft element 200 may include a mounting web 210 that may be used to insert the downdraft element 200 into another downdraft element, for example, into its mounting receptacle 209, or into a pipe system element. The mounting web 210 may include a stop 211 that may define a defined insertion depth of the mounting web 210. The downdraft element 200 may be or become fluidically connected to at least one further downdraft element and/or at least one pipe system element via the mounting receptacles 209 and/or the mounting web 210. The cavity 213 may increase the stiffness of the downdraft element.

Figure 3:
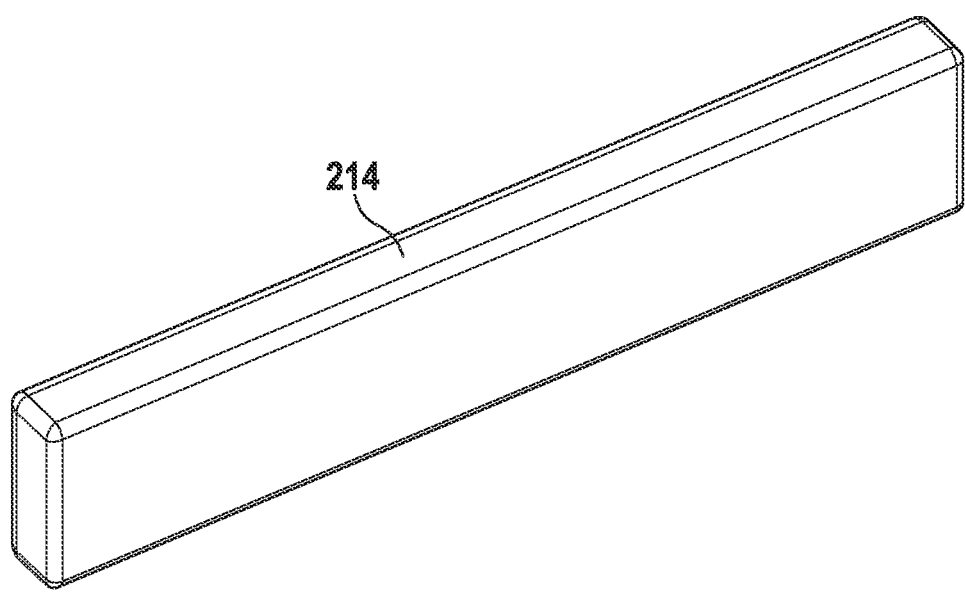
FIG. 3 is an exemplary embodiment of a damper.

FIG. 3 illustrates an exemplary damper 214. The damper 214 may be or comprise a damping mat. The damper 214 may be or comprise a plastic, a foam, or the like.

FIG. 4 shows an example of a double-curved surface 218. The double-curved surface 218 may, for example, be or symbolically represent at least a portion of a guide body 207 or an inner wall or inner side of the downdraft element 200. The two curvatures $\kappa_1$ and $\kappa_2$ of the double curved surface 218 may be a function of the surface coordinates. Exemplarily, FIG. 4 shows a variation of the two curvatures $\kappa_1$ and $\kappa_2$ along a line s between points $s_1$ and $s_2$ on the double-curved surface 218. The line s of FIG. 4 may correspond to the line of the guide element 207 shown in FIG. 2, where the point $s_1$ may be located at or near the stop 208 and the point $s_2$ may be located at or near the stop 211. In the embodiment example shown in FIG. 4, the first curvature $\kappa_1$ is substantially constant along the line s, with the second curvature $\kappa_2$ having a high positive value (greater than $\kappa_1$) at point $s_1$ and a low positive value (less than $\kappa_1$) at point $s_2$. It is obvious that the sign of both curvatures $\kappa_1$ and $\kappa_2$ depends on the definition of the surface normal of the double-curved surface 218. If the sign of the surface normal of the double-curved surface 218 were reversed (or the surface normal defined with a reversed sign), the signs of both the first curvature $\kappa_1$ and the second curvature $\kappa_2$ would also be reversed.

FIG. 5 shows two further exemplary curvatures along a line s of double curved surfaces (not shown in the figures). For example, the second curvature $\kappa_2$ along line s between points $s_1$ and $s_2$ has a change of sign, while the first curvature $\kappa_1$ along the same line s does not undergo a change of sign. In a second example, the first curvature $\kappa_1$ has two sign changes and the second curvature $\kappa_2$ has five sign changes along line s between points $s_1$ and $s_2$.

If the double-curved surface is a conductive element 207, it may be provided that along a line s on the surface of the conductive element 207 at least one of the two curvatures $\kappa_1$ and $\kappa_2$ has at least one change of sign. This is exemplified in FIG. 2: between points $s_{208}$ and $s_{211}$ (which may correspond to points $s_1$ and $s_2$) of line s of conductive element 207, the second curvature $\kappa_2$ changes sign, while the first curvature $\kappa_1$ does not undergo a change of sign. In particular, it may be provided to select the amount and the sign of the respective curvatures or the change of sign in such a way that the flow through the downdraft element 200 is redirected with particularly low loss due to the respective curvatures of the guiding element 207 and/or the inner walls. Due to the improved deflection and the lower pressure loss due to the suitably adapted curvatures, a reduction in flow noise can also be achieved in this case. It can also be provided that the corresponding curvatures are suitably adapted locally in such a way that pressure fluctuations are avoided or at least reduced.

FIGS. 6 and 7 show exemplary embodiments of downdraft elements 200 according to the invention. As shown in FIG. 6, these can have a two-component design, whereby the two components or half parts 202a, 202b can be mirror-symmetrical. As shown in the figures, the downdraft elements 200 may be adapted to receive or be fluidically connected to round tubes and/or flat ducts or the like. In particular, the mounting receptacle 209 and/or mounting web 210 may have a round, oval, rectangular, polygonal shape, or the like. As shown in FIG. 6, the downdraft element 200 may include a marking 204 on an exterior surface that may indicate a preferred flow direction. Such a preferred flow direction may be given, for example, by the shape and/or variable curvatures $\kappa_1$ and $\kappa_2$ of the conductive element 207 and/or the inner walls or inner side (e.g., the distal inner side 215 and/or proximal inner side 216).

FIGS. 8 and 9 show an assembly of a downdraft element 200 and at least one pipe system element connected thereto. The pipe system element 219 may be or include, for example, a pipe elbow, a connector element 100, a flat channel, a circular channel, and/or another downdraft element. Preferably, the downdraft element 200 and the pipe system element are fluidically sealed together. If the pipe system element comprises pipe system flow guide bodies, it may be provided that the pipe system flow guide body or bodies protrude into the downdraft element 200, preferably the mounting receptacle 209 and/or the receptacle formed by the mounting web 210. Alternatively or additionally, the one or more pipe system flow guide bodies may be provided to terminate with or merge into the at least one guide body 207 of the downdraft element 200. The downdraft element 200 may include at least one detent lug 203, and the pipe system element may include at least one detent receptacle complementary to the detent lug 203, via which the first flow opening 205 and/or the second flow opening 206 of the downdraft element and an opening of the pipe system element are releasably fluidically connected to each other. The detent lug 203 may be disposed on or in the mounting receptacle 209 and/or the mounting web 210. The downdraft element 200 may be inserted or inserted into the pipe system element. Alternatively, the pipe system element may be plugged or inserted into the downdraft element 200. It may be provided that the pipe system element 219 is connected to the downdraft element 200 via a connector 100. The connector 100 may be a tubular connector disclosed in the post-published DE 10 2021 113 246 A1. The pipe system element 219 may be a pipe elbow disclosed in post-published DE 10 2021 113 234 A1.

The pipe system element 219 may include at least one pipe system flow guide body 220. If the pipe system element 219 is connected to the downdraft element 200, the pipe system flow guide body 220 may be provided to extend into the downdraft element 200, for example, into the first flow opening 205 or the second flow opening 206. If the pipe system element 219 is connected to the downdraft element 200 via a connector 100, the pipe system flow guide body 220 may protrude into or through the connector 100 into the downdraft element 200. It may be provided that at least one pipe system flow guide body 220 is aligned with, merges into, and/or preferably is flush with at least one guide body 207.

The features disclosed in the description, figures and claims may be essential, individually or in any combination, to the implementation of the invention.

The invention claimed is:

1. A downdraft element comprising a first flow opening and a second flow opening, the first flow opening being arranged relative to the second flow opening at an angle 45°≤α≤135° so that at least the mean flow direction of a fluid entering the first flow opening and exiting the second flow opening or vice versa can be deflected by the angle α, wherein the downdraft element has, on an inner side between the first flow opening and the second flow opening, at least one damper material receptacle and at least one damper inserted into the damper material receptacle; the damper receptacle being located on a distal inner side of the downdraft element, the damper receptacle having a least one flow guide element providing a retaining element for holding an end of the damper and, wherein the damper is shaped such that an inner side of the damper over which the fluid can flow merges substantially evenly with the inner surface of the damper via the flow guide element and wherein the downdraft element is of two-shell design with two shell parts, the shell parts being clamped, bonded, welded and/or screwed to one another.

2. The downdraft element of claim 1, wherein the damper material receptacle is disposed substantially symmetrically with respect to the first flow opening and the second flow opening on the distal inner side of the downdraft element.

3. The downdraft element according to claim 1, wherein the damper si shaped such that and/or comprises a material at least on a surface over which the fluid can flow, such that the inner side of the material over which the fluid can flow merges substantially evenly with the inner surface of the damper.

4. The downdraft element according to claim 1, comprising at least one guide body spaced from the inner side and arranged between the first flow opening and the second flow opening for guiding the flow.

5. The downdraft element according to claim 4, wherein the guide body has a guide surface substantially parallel spaced from the damper material receptacle and/or at least partially facing the damper material receptacle.

6. The downdraft element according to claim 4, wherein at least one of the guide bodies is at least partially punched or perforated or comprises at least one aperture.

7. The downdraft element according to claim 1, wherein the guide body is double curved, with a first curvature arranged substantially along the mean flow direction and a second curvature arranged substantially perpendicular to the first curvature.

8. The downdraft element according to claim 7, wherein the first curvature and/or the second curvature has at least one change of sign.

9. The downdraft element according to claim 1, in which at least one inner side, preferably a distal and/or a proximal inner side, is formed in a partial-circular arc-like manner along the central flow direction at least in a section, the local radius of curvature of the section preferably being formed variably.

10. The downdraft element according to claim 1, wherein the two shell parts are mirror-symmetrical.

11. The downdraft element according to claim 1, which has, at or near the first flow opening and/or second flow opening, a mounting receptacle into which a pipe system element can be introduced for producing a fluidic connection of the pipe system element to the downdraft element, wherein a stop is arranged in the mounting receptacle, which stop defines a defined depth of insertion of the pipe system element.

12. The downdraft element according to claim 1, which has a mounting web with which the downdraft element can be inserted into a pipe system element for establishing a fluidic connection of the downdraft element with the pipe system element, wherein the mounting web has a stop which is arranged circumferentially and which determines a defined insertion depth of the downdraft element.

13. The downdraft element according to claim 1, which has at least one latching lug arranged at and/or near the first flow opening and/or the second flow opening, via which latching lug the downdraft element can be releasably connected to a pipe system element.

14. The downdraft element according to claim 1, having on an outer side a marking indicating a flow direction through the flow openings with lowest average pressure loss.

15. An assembly of a downdraft element according to claim 1 and at least one pipe system element having an opening, wherein
  a) the downdraft element has at least one latching lug at and/or near the first flow opening and/or the second flow opening, and the pipe system element has at least one latching receptacle which is complementary to the latching lug and via which the first flow opening and/or the second flow opening of the downdraft element and the opening of the pipe system element are detachably fluidically connected to one another, and/or
  b) the downdraft element has a mounting receptacle at or near the first flow opening and/or second flow opening and the pipe system element has a circumferential fastening projection at the opening, the fastening projection being received in the mounting receptacle and the first flow opening and/or the second flow opening of the downdraft element being fluidically connected to the opening of the pipe system element, and/or
  c) the downdraft element has a mounting web at or near the first flow opening and/or second flow opening, and the pipe system element has an insertion receptacle at the opening, wherein the mounting web is received in the insertion receptacle and the first flow opening and/or the second flow opening of the downdraft element is fluidically connected to the opening of the pipe system element.

16. The assembly of claim 15, wherein the downdraft member comprises at least one flow directing guide body and the piping system member comprises at least one pipe system flow guide body, wherein
   a) the pipe system flow guide body extends into the downdraft element and/or
   b) the pipe system flow guide body merges into the guide body and/or is arranged parallel in front of and/or behind the guide body in the direction of flow.

\* \* \* \* \*